United States Patent
Onaizi

(10) Patent No.: US 12,427,499 B2
(45) Date of Patent: Sep. 30, 2025

(54) PROCESS FOR REMOVING HYDROGEN SULFIDE FROM SOUR GASES

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 597 days.

(21) Appl. No.: 17/970,102

(22) Filed: Oct. 20, 2022

(65) Prior Publication Data

US 2024/0157328 A1    May 16, 2024

(51) Int. Cl.
*B01J 20/22* (2006.01)
*B01D 53/12* (2006.01)
(Continued)

(52) U.S. Cl.
CPC ............ *B01J 20/226* (2013.01); *B01D 53/12* (2013.01); *B01D 53/1468* (2013.01);
(Continued)

(58) Field of Classification Search
CPC .. B01J 20/226; B01J 20/205; B01J 20/28007; B01J 20/28016; B01J 20/28064;
(Continued)

(56) References Cited

U.S. PATENT DOCUMENTS

| | | |
|---|---|---|
| 4,673,557 A | 6/1987 | Nieskens et al. |
| 4,957,715 A | 9/1990 | Grover et al. |
| (Continued) | | |

FOREIGN PATENT DOCUMENTS

KR    10-2022-0085849    6/2022

OTHER PUBLICATIONS

Shah, Hydrogen Sulfide Capture: From Absorption in Polar Liquids to Oxide, Zeolite, and Metal-Organic Framework Adsorbents and Membranes, "Chemical Reviews", ACS, 117, pp. 9755-9803, 2017 (Year: 2017).*

(Continued)

*Primary Examiner* — Anthony J Zimmer
*Assistant Examiner* — Jaanzeb C Raja
(74) *Attorney, Agent, or Firm* — Oblon, McClelland, Maier & Neustadt, L.L.P.

(57) ABSTRACT

A process for removing hydrogen sulfide ($H_2S$) from a $H_2S$-containing gas composition includes charging a liquid to a reactor under continuous agitation and dispersing particles of a zinc-based zeolitic imidazolate framework-8 (ZIF-8) in the liquid to form a ZIF-8 mixture. The method further includes introducing the $H_2S$-containing gas composition to the reactor containing the ZIF-8 mixture under continuous agitation and passing the $H_2S$-containing gas composition through the ZIF-8 mixture. In addition, the method includes adsorbing the $H_2S$ from the $H_2S$-containing gas composition onto the ZIF-8 to remove the $H_2S$ from the $H_2S$-containing gas composition and form a purified gas composition.

20 Claims, 6 Drawing Sheets

(51) Int. Cl.
  *B01D 53/14* (2006.01)
  *B01J 20/20* (2006.01)
  *B01J 20/28* (2006.01)
  *B01J 20/30* (2006.01)
  *C10L 3/10* (2006.01)

(52) U.S. Cl.
  CPC ....... *B01J 20/205* (2013.01); *B01J 20/28007* (2013.01); *B01J 20/28016* (2013.01); *B01J 20/28064* (2013.01); *B01J 20/28066* (2013.01); *B01J 20/28071* (2013.01); *B01J 20/28073* (2013.01); *B01J 20/2808* (2013.01); *B01J 20/28083* (2013.01); *B01J 20/3071* (2013.01); *B01J 20/3085* (2013.01); *C10L 3/103* (2013.01); *B01D 2252/103* (2013.01); *B01D 2253/204* (2013.01); *B01D 2253/304* (2013.01); *B01D 2253/308* (2013.01); *B01D 2256/24* (2013.01); *B01D 2257/304* (2013.01); *C10L 2290/542* (2013.01)

(58) Field of Classification Search
  CPC ............ B01J 20/28066; B01J 20/28071; B01J 20/28073; B01J 20/2808; B01J 20/28083; B01J 20/3071; B01J 20/3085; B01D 53/12; B01D 53/1468; B01D 2252/103; B01D 2253/204; B01D 2253/304; B01D 2263/308; B01D 2256/24; B01D 2257/304; C10L 2290/542
  See application file for complete search history.

(56) References Cited

U.S. PATENT DOCUMENTS

| | | |
|---|---|---|
| 8,673,059 B2 | 3/2014 | Leta et al. |
| 10,696,558 B2 | 6/2020 | Falkowski et al. |
| 11,033,856 B2 | 6/2021 | Liu et al. |

OTHER PUBLICATIONS

Wu, Extraction desulphurization of fuels using ZIF-8-based porous liquid, Fuel, vol. 300, 2021 (Year: 2021).*

Ploymeerusmee, et al.; Porous material adsorbents ZIF-8, ZIF-67, Co/Zn-ZIF MIL-127(Fe) for separationof HS from a HS/CH mixture; Molecular Simulation, vol. 48, Issue 5; Jan. 20, 2022; 1 Page; Abstract Only.

* cited by examiner

PROCESS FOR REMOVING HYDROGEN SULFIDE FROM SOUR GASES

BACKGROUND

Technical Field

The present disclosure is directed to a process for removing hydrogen sulfide ($H_2S$) from a $H_2S$-containing fluid, and particularly, to the process for removing $H_2S$ from a gaseous composition with zinc-based zeolitic imidazolate frameworks.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Hydrogen sulfide is a colorless, odiferous and highly toxic gas generated primarily from gas and oil reservoirs [King, F. W., 1974, Taking $H_2S$ from liquid sulfur: Why and how. The Oil and Gas Journal, Jun. 3, 1974.]. $H_2S$ escaped from the gas and oil reservoirs during well drilling and stimulation might be entrained in the produced water. Exposure of working personnel to $H_2S$ can cause possible life-threatening situations at a concentration as low as 350 ppm for a short-term exposure. In addition to its toxicity, health and safety issues, this colorless gas is also highly corrosive and hence it is desirable and often necessary to remove hydrogen sulfide from a hydrogen sulfide containing stream, such as sour natural gas, biogas, and sour gases.

Accordingly, the maximum concentration of $H_2S$ in marketable natural gas is 4 ppmv at standard temperature and pressure [Mandald, B.; Bandyopadhyay, S.S., Simultaneous absorption of $CO_2$ and $H_2S$ into aqueous blends of N-methyldiethanolamine and diethanolamine, Environ Sci Technol., 2006, 40(19):6076-84], which is considered to be the threshold value above which the natural gas needs to be sweetened in order to reduce the $H_2S$ concentration. Localized corrosion and stress cracking is common in pipes/units handling $H_2S$-containing streams. It has been reported that the presence of $H_2S$ even at low concentrations can cause a substantial adverse impact on carbon steel [Rebak, R. B.; Perez T. E., Effect of Carbon Dioxide and Hydrogen Sulfide on the Localized Corrosion of Carbon Steels and Corrosion Resistant Alloys., 2017, NACE International Conference: New Orleans, Louisiana, USA.]. Therefore, $H_2S$ must be effectively scavenged from sour gases to not only mitigate its safety and operational issues but also reduce its damage to the pipelines, valves and surfaces of process equipment.

Technologies and approaches to these problems have been developed industrially for sweetening (e.g., removing $H_2S$) hydrocarbons and natural gas. These technologies and approaches mainly involve the use of amine-based solutions, carbonaceous materials, or metal salts as adsorbents for the adsorption of $H_2S$, or as oxidizers for converting $H_2S$ to more harmless element sulfur. However, these technologies and approaches suffer from high production costs, corrosivity problems associated with the amine-based solutions, lack of selectivity, and by-product generation, etc. Thus, efforts have been taken to develop tools and methods of scavenging $H_2S$ from natural gas and other sour gases.

U.S. Pat. No. 9,587,181 to Lehrer et al. (Lehrer) discloses the use of water-soluble aldehydes and transition metal salts for $H_2S$ scavenging present in aqueous fluids. Garrett et al. [Garrett, R. L.; Clark, R. K.; Carney, L. L.; Grantham, C. K., Chemical scavengers for sulfides in water-base drilling fluids, Journal of Petroleum Technology., 1979, 31(6):787-796, incorporated herein by reference in its entirety] uses zinc compounds (e.g., zinc carbonate and zinc oxide) as $H_2S$ scavengers. U.S. Pat. No. 9,480,946 to Ramachandran et al. (Ramachandran) discloses the use of metal carboxylate salts as $H_2S$ scavengers in both dry and wet hydrocarbon gas systems. Divalent iron salts have shown capability to absorb $H_2S$ from drilling mud as described in U.S. Pat. No. 6,365,053. Copper carbonate is also able to remove $H_2S$ from gaseous streams as disclosed by Dyke and Wagner in U.S. Pat. No. 3,506,572. U.S. Pat. No. 6,960,330 to Cox (Cox) describes a method for reducing $H_2S$ contamination by adding Fe-MGDA and a peroxide (e.g., hydrogen peroxide) to a $H_2S$-containing medium. Browning et al. (described in U.S. Pat. No. 3,928,211) reveals that zinc and copper compounds (e.g., $Zn(OH)_2$, $CuCO_3$, and $ZnCO_3$) can reduce the concentration of $H_2S$ (in the form of soluble sulfides) from more than 1,100 ppm to about 50 ppm.

U.S. Pat. No. 5,700,438 to Miller (Miller) discloses a process for $H_2S$ and mercaptans removal from gas streams by contacting a $H_2S$-conatining gas stream with an aqueous solution of copper complex of a water-soluble amine. The reaction of the copper complex of the water-soluble amine with $H_2S$ generates water-insoluble copper sulfide and releases the water-soluble amine. U.S. Pat. No. 4,153,547 A to McLean (McLean) discloses a method for the desulfurization of well water using acidified copper sulfate. WO Pat. No. 2015116864 A1 to Martin (Martin) describes the use of a family of metals chelates for hydrogen sulfide scavenging from asphalt. EP Pat. 0,257,124 A1 to McManus and Kin (McManus and Kin) discloses the use of an aqueous chelated polyvalent metal catalyst solution for $H_2S$ scavenging. U.S. Pat. No. 4,478,800 A to Willem et al. (Willem) relates to a method for the removal of sulfur compounds from gaseous streams. The method involves passing a $H_2S$-containing gaseous stream over an inert support containing metal oxides. The supported metal oxides can react with $H_2S$ and generate metal-sulfur compounds.

Oakes discloses in U.S. Pat. No. 4,473,115 a method for reducing the concentration of $H_2S$ present in subterranean well fluids through the injection of a stabilized solution of chlorine dioxide. The mixing of the said solution with a drilling mud can further reduce the $H_2S$ content in a $H_2S$-contaminated drilling mud. U.S. Pat. No. 4,805,708 to Matza et al. (Matza) discloses a method for controlling the content of zinc-based $H_2S$ scavenger added to oil-based drilling fluids. U.S. 9,587,181 B2 to Lehrer et al. (Lehrer) discloses the use of $H_2S$ scavengers based on transition metal salts (e.g., zinc carboxylate or iron carboxylate) and at least one water-soluble aldehyde/aldehyde precursor (e.g., ethylene glycol hemiformal) for $H_2S$ removal from natural gas, crude oil, and aqueous fluids (e.g., produced water streams) and mixed streams of natural gas-crude oil-water.

Davidson et al. [Davidson, E.; Hall, J.; Temple, C., An environmentally friendly highly effective hydrogen sulfide scavenger for drilling fluids, SPE Drilling & Completion., 2004, 19(4):229-234] describes the application of iron-gluconate for $H_2S$ scavenging from drilling fluids. Davidson et al. also discloses the $H_2S$ iron-gluconate scavenger in U.S. Pat. No. 6,746,611 B2.

U.S. Pat. No. 6,881,389 to Paulsen et al. (Paulsen) proposes a process for the removal of hydrogen sulfide and/or carbon dioxide from natural gas via absorption and disassociation utilizing a seawater contact system. U.S. Pat. No. 7,235,697 to Muller et al. (Muller) discloses a process for producing thiols, thioethers and disulfides by reacting olefins with hydrogen sulfide in the presence of water and carbon dioxide. U.S. Pat. No. 6,946,111 to Keller et al. (Keller) discloses a process for the $H_2S$ removal from a gas stream via the reaction of $H_2S$ with $O_2$ over a suitable catalyst. U.S. Pat. No. 5,215,728 to McManus (McManus) discloses a method for $H_2S$ scavenging using a polyvalent metal redox absorption solution.

Additionally, U.S. Pat. No. 6,444,185 to Nougayrede et al. (Nougayrede) discloses a process for the simultaneous desulfurization of sulfurous compounds such as $H_2S$, $SO_2$, COS and/or $CS_2$, where these sulfur-containing gases are oxidized and hydrolyzed at a temperature ranging from 180 to 700° C. U. S. 2015/0034319 A1 to Tylor (Tylor) discloses the use of triazine for $H_2S$ scavenging. Triazine and glyoxal are among the most widely used $H_2S$ scavengers in oil and gas industries. However, the reaction of triazine and glyoxal with $H_2S$ is slow when they are used in downhole injection applications. Another limitation of triazine and glyoxal is their low thermal stability. Furthermore, triazines components have high scaling tendency, which is undesirable. U.S. Pat. No. 6,495,117 to Lynn (Lynn) describes a process for the recovery of elemental sulfur from $H_2S$-containing gases by treating the $H_2S$-containing gases in a series of liquid-phase reactors.

Practical approaches have been developed in the art, however these approaches often involve (i) complicated homogenous systems, (ii) sophisticated chemical agents, e.g., highly functionalized chelating agents, flammable oxidizing agents and costly stabilizers, and (iii) restricted application conditions, e.g., limited pH ranges, particular temperature ranges, and certain pressure requirements. Hence, there is a need for improved desulfurization and/or sweetening techniques, and apparatuses and protocols for such treatment.

In view of the forgoing, one objective of the present disclosure is to provide a process for removing $H_2S$ from a $H_2S$-containing gas composition. A further objective of the present disclosure is to provide a method of making a zinc-based zeolitic imidazolate framework-8 (ZIF-8), and its application in a continuous tank process for the desulfurization of sour gases and liquid hydrocarbon fuels.

SUMMARY

In an exemplary embodiment, a process for removing hydrogen sulfide ($H_2S$) from a $H_2S$-containing gas composition is described. The process for removing $H_2S$ from the $H_2S$-containing gas composition includes charging a liquid to a reactor under continuous agitation. The process also includes dispersing particles of a zinc-based zeolitic imidazolate framework-8 (ZIF-8) in the liquid to form a ZIF-8 mixture. The process further includes continuously agitating the ZIF-8 mixture. In addition, the process involves introducing the $H_2S$-containing gas composition to the reactor containing the ZIF-8 mixture under continuous agitation and passing the $H_2S$-containing gas composition through the ZIF-8 mixture. Furthermore, the process also includes adsorbing the $H_2S$ from the $H_2S$-containing gas composition onto the ZIF-8 to remove the $H_2S$ from the $H_2S$-containing gas composition and form a purified gas composition.

In some embodiments, the ZIF-8 particles have a mean particle size in a range of 5 to 200 nm.

In some embodiments, the ZIF-8 particles have a porous structure. In some embodiments, the ZIF-8 particles have a mean pore size in a range of 0.5 to 5 nm.

In some embodiments, the ZIF-8 is supported on at least one support selected from the group consisting of a graphene-based material, an alumina, a carbon nanotube, an activated carbon, a metal organic framework (MOF), a zeolitic nanotube, and a covalent organic polymer (COP).

In some embodiments, the supported ZIF-8 has a delaminated structure comprising charged crystalline particles, in which a distance between laminated layers is in a range of 1 to 50 nm.

In some embodiments, the graphene-based material comprises at least one selected from the group consisting of graphene, graphyne, graphydiyne, graphene oxide, reduced graphene oxide, and exfoliated graphite.

In some embodiments, a weight ratio of the ZIF-8 to the support is from 20:1 to 1:20.

In some embodiments, the liquid comprises at least one selected from the group consisting of tap water, ground water, distilled water, deionized water, saltwater, hard water, fresh water, and wastewater.

In some embodiments, the reactor is a stirred tank reactor in the form of a vertical cylindrical reactor containing at least one propeller agitator disposed therein. In some embodiments, the vertical cylindrical reactor has a bottom portion, a vertically oriented cylindrical body portion and a top portion. In some embodiments, the bottom portion is cone shaped or pyramidal. In some embodiments, a plurality of recirculation tubes fluidly connects the bottom portion of the vertical cylindrical reactor with the body portion of the vertical cylindrical reaction.

In some embodiments, the $H_2S$-containing gas composition is natural gas.

In some embodiments, the $H_2S$-containing gas composition further comprises at least one gas selected from the group consisting of nitrogen, argon, methane, ethane, ethylene, propylene, propane, butane, butene, butadiene, and isobutylene.

In some embodiments the $H_2S$ is present in the gas composition at a concentration in a range of 10 to 200 parts per million by volume (ppmv) based on a total volume of the gas composition.

In some embodiments, the $H_2S$-containing gas composition is introduced to the reactor at a rate of 0.4 to 2.0 milliliters per minute (mL/min) per milligram of the ZIF-8.

In some embodiments, the ZIF-8 is present in the liquid at a concentration in a range of 0.1 to 10 milligrams per milliliter (mg/mL).

In some embodiments, during the introducing and adsorbing the ZIF-8 is in contact with the $H_2S$-containing gas composition at a temperature in a range of from 15 to 40° C. and under a pressure of 0.9 to 1.2 bar.

In another exemplary embodiment, the process for removing $H_2S$ from a $H_2S$-containing gas composition further includes preparing the ZIF-8. In one embodiment, the preparing the ZIF-8 involves mixing and dissolving a zinc salt in a first liquid to form a first solution. In another embodiment, the preparing the ZIF-8 involves mixing and dissolving an imidazole compound in a second solution comprising ammonia to form a second solution. In yet another embodiment, the preparing the ZIF-8 involves adding the first solution to the second solution under agitation to form a mixture. In a further embodiment, the preparing the ZIF-8 includes reacting the zinc salt from the first solution with the imidazole compound from the second solution to form the ZIF-8 in a ZIF-8-containing aqueous composition. In yet still another embodiment, the preparing the ZIF-8 includes removing the ZIF-8 from the ZIF-8-containing aqueous composition and washing to form a wet ZIF-8. In addition, the preparing the ZIF-8 includes heating and drying the wet ZIF-8 to form the ZIF-8.

In some embodiments, the zinc salt is at least one selected from the group consisting of zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, zinc bromide, and/or its hydrate.

In some embodiments, the imidazole compound comprises an imidazole of formula (I) and a benzimidazole of formula (II),

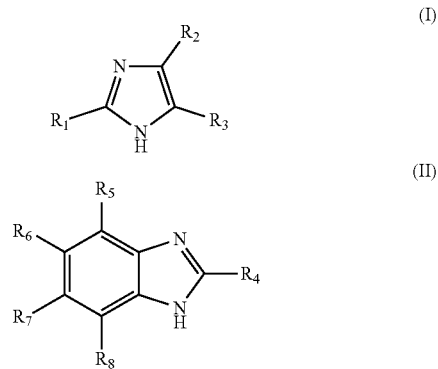

in which $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano.

In some embodiments, a molar ratio of the zinc salt to the imidazole compound present in the mixture is in a range of 1:2 to 1:6. In some embodiments, the imidazole compound is 2-methylimidazole.

In some embodiments, the ZIF-8 has a specific surface area in a range of 900 to 1500 $m^2/g$. In some embodiments, the ZIF-8 has a cumulative specific pore volume in a range of 0.2 to 0.8 $cm^3/g$. In some embodiments, the ZIF-8 has an average pore diameter of 0.5 to 3.5 nm.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
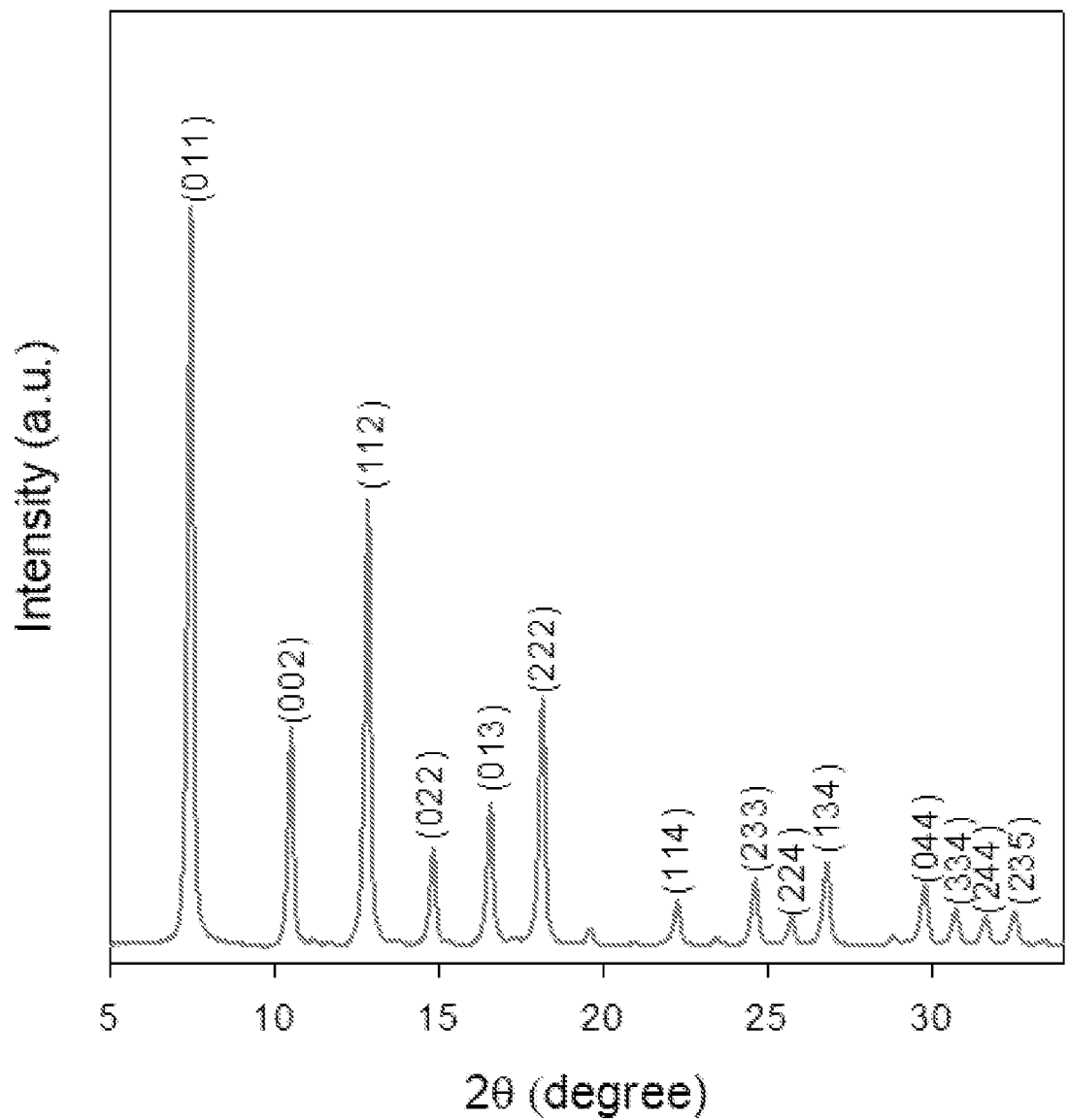
FIG. 1 is an XRD pattern of a ZIF-8, according to certain embodiments.

In the following description, it is understood that other embodiments may be utilized, and structural and operational changes may be made without departure from the scope of the present embodiments disclosed herein.

Embodiments of the present disclosure will now be described more fully hereinafter with reference to the accompanying drawings, in which some, but not all embodiments of the disclosure are shown. In the drawings, like reference numerals designate identical or corresponding parts throughout the several views.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "fluid" refers to a gas, a liquid, a mixture of gas and liquid, or a gas or liquid comprising dispersed solids, droplets and/or bubbles. The droplets and/or bubbles may be irregular or regular and may be similar or different in size.

As used herein, the term "stirred tank reactor," "continuous stirred tank reactor," "mixed flow reactor," "continuous flow stirred tank reactor," and similar terms generally refer to a model for a chemical reactor in chemical engineering. The stirred tank reactor may have a liquid height and a rotating shaft containing a plurality of agitator blades.

As used herein, the term "hydrocarbon" refers to hydrocarbon compounds, i.e., aliphatic compounds (e.g., alkanes, alkenes or alkynes), alicyclic compounds (e.g., cycloalkanes, cycloalkylenes), aromatic compounds, aliphatic and alicyclic substituted. It may refer to aromatic compounds, aromatic substituted aliphatic compounds, aromatic substituted alicyclic compounds and similar compounds. The term "hydrocarbon" may also refer to a substituted hydrocarbon compound, e.g., a hydrocarbon compound containing non-hydrocarbon substituents. Examples of non-hydrocarbon substituents may include hydroxyl, acyl, nitro and the like. The term "hydrocarbon" may as well refer to a heterosubstituted hydrocarbon compound, i.e., a hydrocarbon compound which comprises an atom other than carbon in the chain or ring and the other part comprises a carbon atom. Heteroatoms may include, for example, nitrogen, oxygen, sulfur and similar elements.

The present disclosure describes a process for $H_2S$ scavenging from sour gases and liquids in a continuous stirred tank reactor to meet the growing needs of desulfurization on an industrial scale. The process optionally involves making and using a ZIF-8 to react with the $H_2S$ in a heterogeneous mixture. In addition, the ZIF-8 may also be supported on a graphene oxide (GO) support and that is submerged and kept suspended in a liquid under mechanical agitation. The effectiveness of the said process and compound has been assessed by injecting a sour natural gas into a stirred tank reactor containing ZIF-8 dispersed in a liquid. The gas leaving the stirred tank reactor is continuously monitored and the concentration of $H_2S$ in the sweetened gas is continuously measured, enabling the construction of $H_2S$ breakthrough curves and the calculation of the amount of $H_2S$ scavenged.

According to a first aspect, the present disclosure relates to a process for removing hydrogen sulfide ($H_2S$) from a $H_2S$-containing gas composition. The process for removing $H_2S$ from a $H_2S$-containing gas composition involves (i) charging a liquid to a reactor optionally under continuous agitation, (ii) dispersing particles of a zinc-based zeolitic imidazolate framework-8 (ZIF-8) in the liquid to form a ZIF-8 mixture, (iii) continuously agitating the ZIF-8 mixture, (iv) introducing the $H_2S$-containing gas composition to the reactor containing the ZIF-8 mixture under continuous agitation and passing the $H_2S$-containing gas composition through the ZIF-8 mixture, and (v) adsorbing the $H_2S$ from the $H_2S$-containing gas composition onto the ZIF-8 to remove the $H_2S$ from the $H_2S$-containing gas composition and form a purified gas composition.

Figure 5:
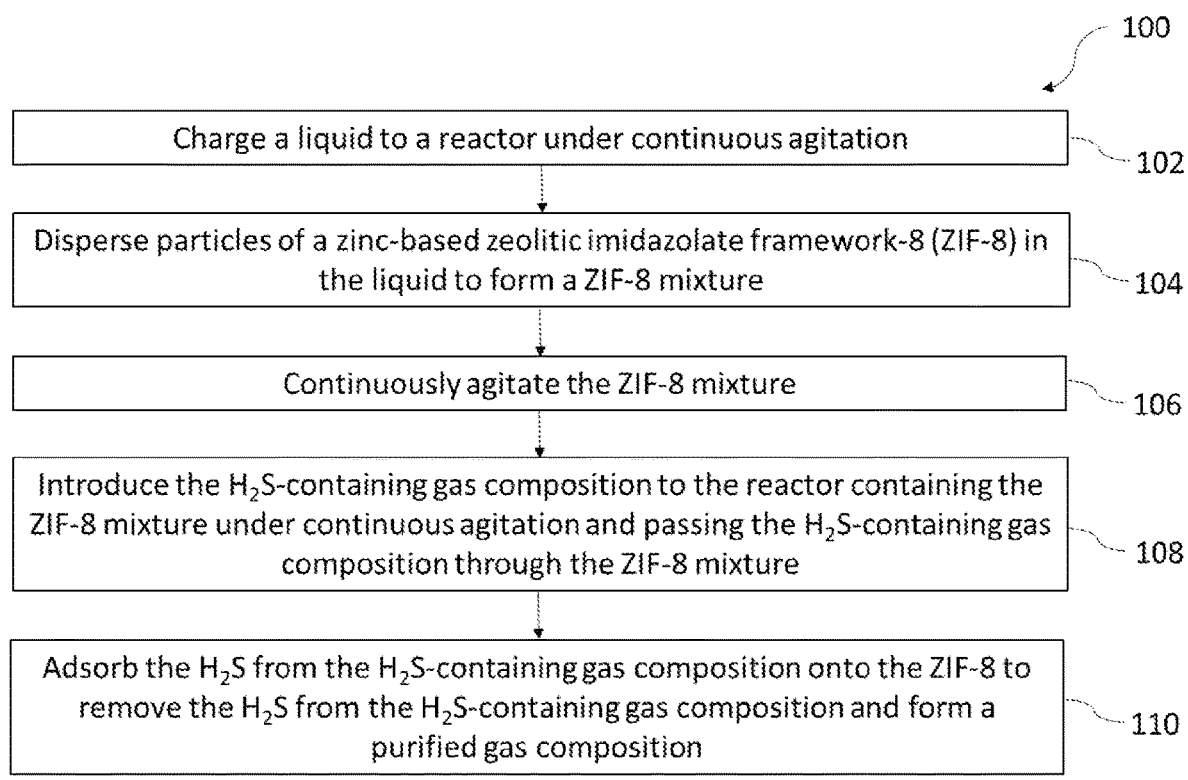
FIG. 5 is a schematic flow diagram of a process for removing $H_2S$ from a $H_2S$-containing gas composition, according to certain embodiments.

Referring to FIG. 5, a schematic flow diagram of a process for removing $H_2S$ from a $H_2S$-containing gas composition is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes charging a liquid to a reactor under continuous agitation. In one exemplary embodiment, the liquid includes an aqueous media, an oil, an oil-in-water emulsion, and/or a water-in-oil emulsion. In one embodiment, the liquid is a sour oil. In a preferred embodiment, the liquid is a sour water. In a more preferred embodiment, the liquid is selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation, and is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the liquid may further contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene. In some more other embodiments, the liquid may contain a minority fraction of, or even no, water.

In some preferred embodiments, the liquid comprises at least 50, 60, 70, 75, 80, 85, 90, 95, 96, 97, 97.5, 98, 99, 99.1, 99.5, or 99.9 wt. % $H_2O$, based upon a total weight of the liquid.

In a further exemplary embodiment, the reactor is at least one reactor selected from the group consisting of a stirred tank reactor, a packed bed reactor, a slurry reactor, and a bubble column reactor. In some embodiments, the reactor is a stirred tank reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the liquid occupies at least 1/20, 1/10, 3/10, 1/2, 2/3, 4/5, or 9/10 of the reactor volume. In some embodiments, the liquid occupies no more than 10/11, 9/10, 4/5, 2/3, 1/2, 3/10, or 1/10 of the reactor volume. In some embodiments, means of stirring or agitation may include magnetic stirring via magnetic spin bar, impellers, and/or ultrasonic waves. In certain embodiments, stirring or agitation may speed up the removal of $H_2S$.

In some embodiments, the reactor maybe a vertical cylindrical reactor. In some embodiments, the reactor has a plurality of inlets and outlets for fluids at the bottom of the reactor. In some further embodiments, the reactor has a plurality of inlets and outlets for fluids at the top of the reactor. In a preferred embodiment the reactor has a plurality of inlets and outlets for liquid-suspended solids at the bottom of the reactor. In some further preferred embodiments, the reactor has a plurality of inlets for solids at the top of the reactor.

At step 104, the method 100 includes dispersing particles of a zinc-based zeolitic imidazolate framework-8 (ZIF-8) in the liquid to form a ZIF-8 mixture. In some embodiments, the ZIF-8 particles have a mean particle size in a range of 5 to 200 nm, preferably 15 to 180 nm, preferably 30 to 160 nm, preferably 60 to 140 nm, preferably 80 to 120 nm, or even more preferably about 100 nm. Other ranges are also possible.

In some embodiments, the ZIF-8 particles have a porous structure. In some further embodiments, the ZIF-8 particles have a mean pore size in a range of 0.5 to 5 nm, preferably 0.7 to 4.5 nm, preferably 0.9 to 4 nm, preferably 0.9 to 3.5 nm, preferably 1.1 to 3 nm, preferably 1.3 to 2.5 nm, preferably 1.5 to 2 nm, or even more preferably 1.7 nm. Other ranges are also possible.

In some embodiments, the ZIF-8 is supported on at least one support selected from the group consisting of a graphene-based material, an alumina, a carbon nanotube, an activated carbon, a metal organic framework (MOF), a zeolitic imidazolate framework (ZIF), and a covalent organic polymer (COP). In some embodiments, the graphene-based material comprises at least one selected from the group consisting of graphene, graphyne, graphdiyne, graphene oxide, reduced graphene oxide, and exfoliated graphite.

In some embodiments, the supported ZIF-8 has a delaminated structure having charged crystalline particles. In some embodiments, a distance between laminated layers is in a range of 1 to 50 nm, preferably 3 to 40 nm, preferably 5 to 30 nm, preferably 7 to 20 nm, or even more preferably 9 to 15 nm. Other ranges are also possible.

In some preferred embodiments, the ZIF-8 is supported on a graphene oxide (GO). In certain embodiments, the graphene oxide is in the form of sheet having a thickness of 0.5 to 50 nm, preferably 1 to 25 nm, or even more preferably about 15 nm. In certain embodiments, the graphene oxide comprises a plurality of holes in the basal plane therein formed by oxidation to form a network of interconnected graphene oxide nanoribbons between the plurality of holes in the basal plane, the plurality of holes having an average diameter in the range of 1 to 500 nm, preferably 50 to 250 nm, or even more preferably 100 to 150 nm. In certain embodiments, the graphene oxide has an oxygen content less than 35% by weight based on a total weight of the GO, preferably less than 15% by weight, preferably less than 10% by weight, or more preferably less than 5% by weight, based on a total weight of the GO. Other ranges are also possible.

The crystalline structure of the ZIF-8 is characterized by X-ray diffraction (XRD). In some embodiments, the XRD patterns are collected in a PANAlytical diffractometer (X'Pert PRO) equipped with a Cu-Kα radiation source ($\lambda$=0.15406 nm) for a 2θ range extending between 10 and 80°, preferably 20 and 70°, further preferably 30 and 60° at an angular rate of 0.005 to 0.04° $s^{-1}$, preferably 0.01 to 0.03° $s^{-1}$, or even preferably 0.02° $s^{-1}$.

In some embodiments, the ZIF-8 has a first intense peak with a 2 theta (θ) value in a range of 5 to 10° in an X-ray diffraction (XRD) spectrum, as depicted in FIG. 1. In some further embodiments, the ZIF-8 has a second intense peak with a 2θ value in a range of 10 to 20° in the XRD spectrum, as depicted in FIG. 1. In some preferred embodiments, the ZIF-8 has at least a third peak with a 2θ value in a range of 20 to 35° in the XRD spectrum, as depicted in FIG. 1.

Figure 2:
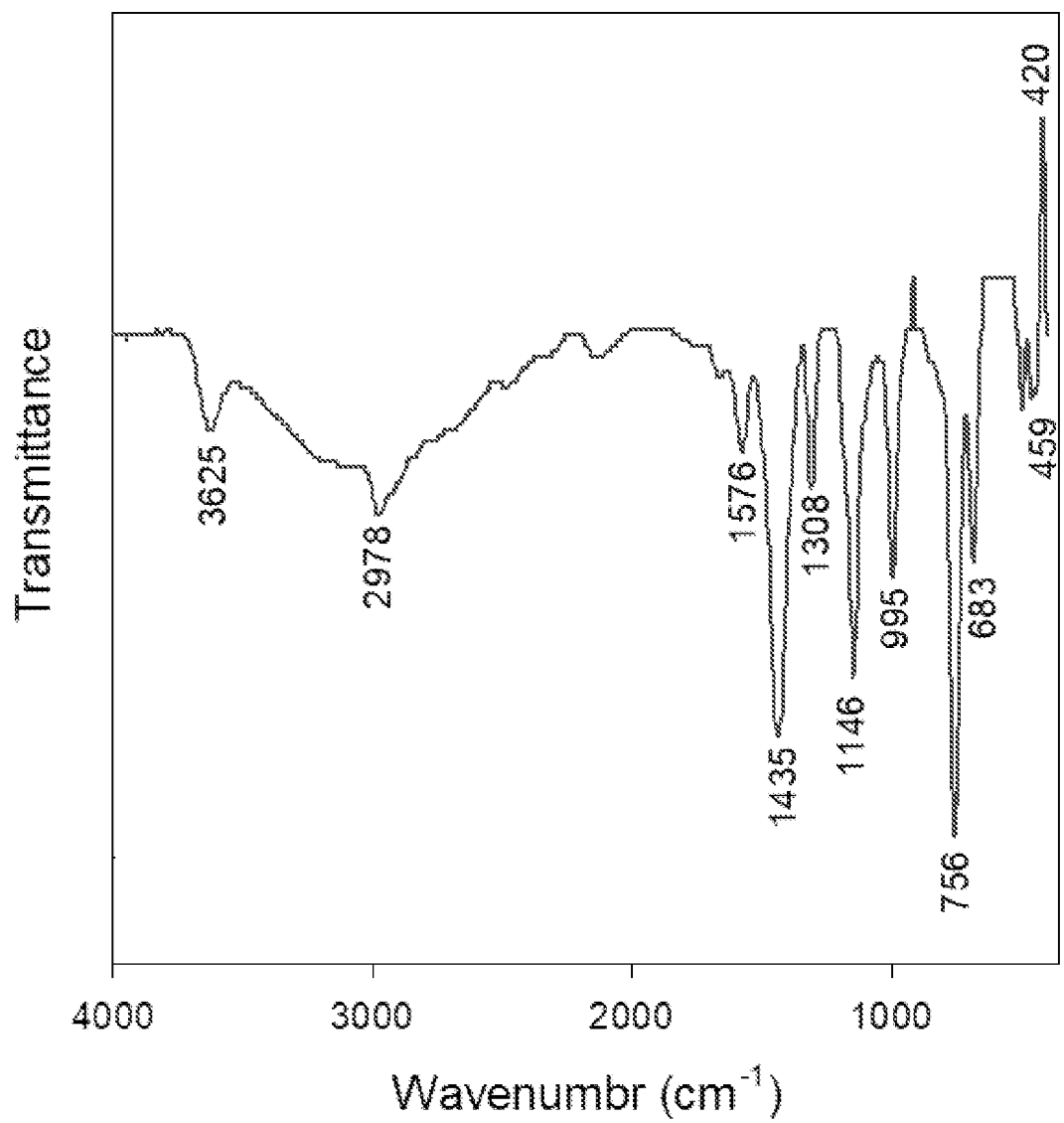
FIG. 2 is an FTIR spectrum of a ZIF-8, according to certain embodiments.

Even further, the structure of the ZIF-8 is also characterized by the Fourier transform infrared spectra (FTIR) as depicted in FIG. 2. FTIR spectra of the ZIF-8 is studied by using Fourier transform infrared spectra (Nicolet 170 IR spectrometer). For the Fourier transform infrared spectra characterization, the KBr discs of the samples are prepared by mixing and grounding the samples with KBr powder in mortar with pestle. The mixture is then shaped into discs under mechanical pressure. The sample discs are put into Fourier transform infrared spectra and spectral measurements are recorded in the wavenumber range of 450-4000 $cm^{-1}$. Prior to the above measurement, the samples are vacuum-dried at 60° C. for a duration of 24 h.

In some embodiments, the ZIF-8 has a first intense peak in a range of 650 to 800 $cm^{-1}$, a second intense peak in a range of 850 to 1050 $cm^{-1}$, a third intense peak in a range of 1100 to 1200 $cm^{-1}$, a fourth intense peak in a range of 1350 to 1450 $cm^{-1}$, and a fifth intense peak in a range of 2900 to 3800 $cm^{-1}$ in an FTIR spectrum, as depicted in FIG. 2. Other ranges are also possible.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanomaterial is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanomaterial is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

In some embodiments, the support is aluminum oxide. In some embodiments, the aluminum oxide is gamma (γ) aluminum oxide. In some embodiments, the aluminum oxide may include, but are not limited to, alpha (α) aluminum oxide and beta (β) aluminum oxide.

As used herein, the term "zeolitic," "zeolite," "zeolitic materials," and similar terms generally refer to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

The International Union of Pure and Applied Chemistry (IUPAC) states that a metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one, two, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e., N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network.

In one or more embodiments, the ligand comprises an imidazole of formula (I) and a benzimidazole of formula (II):

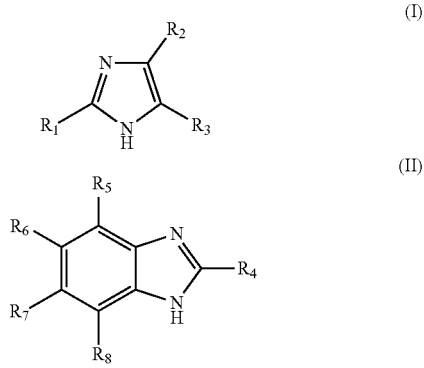

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-i sopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole-4-carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-yl-methanol, 2-benzimidazolemethanol, 4-chloro-6-(trifluoromethyl)benzimidazole, 5-chloro-2-(trichloromethyl)benzimidazole, 5-cyanobenzimidazole, (2-benzimidazolyl)acetonitrile, (5-chloro-1H-benzimidazol-2-yl)methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl)ethanol, 2-(1H-benzoimidazol-2-yl)-acetamide, (6-methoxy-1H-benzimidazol-2-yl)methanol, 5,6-dimethoxybenzimidazole, 2-(1H-benzoimidazol-2-yl)-ethylamine, 1-(5-methyl-1H-benzimidazol-2-yl)methanamine, 1-(5-methyl-1H-benzimidazol-2-yl)ethanamine, 2-benzimidazolepropionic acid, 2-(5-methyl-1H-benzimidazol-2-yl)ethanamine, 2-(3-hydroxy-N-propyl)-5-(trifluoromethyl)-benzimidazole, and N-methyl-1-(5-methyl-1H-benzimidazol-2-yl)methanamine. In preferred embodiments, the benzimidazole of formula (II) is 5-methylbenzimidazole.

In one or more embodiments, a molar ratio between the imidazole of formula (I) to the benzimidazole of formula (II) ranges from 1:1 to 1:4, preferably 2:3 to 2:7, more preferably 4:7 to 1:3, even more preferably 5:9 to 2:5, or about 1:2.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In some embodiments, the porous support is aluminum oxide. In some embodiments, the aluminum oxide is gamma (γ) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

Multiple types of the ZIF particles may be used, which differ in various properties such as identity of composition of the ZIF, size, shape, or other similar property. In general, the ZIF particles may have any suitable shape as described above. The shape may be uniform or non-uniform. In some embodiments, the ZIF has a delaminated structure comprising charged crystalline particles. In one or more embodiments, a distance between laminated layers is in a range of 1 to 100 nm, preferably 1 to 50 nm, preferably 3 to 40 nm, preferably 5 to 30 nm, preferably 7 to 20 nm, or even more preferably 9 to 15 nm. Other ranges are also possible.

In still yet some other embodiments, a weight ratio of the ZIF-8 to the support is from 20:1 to 1:20, preferably 15:1 to 1:15, preferably 10:1 to 1:10, preferably 5:1 to 1:5, and more preferably 2:1 to 1:2. Other ranges are also possible.

In some embodiments, the supported ZIF-8 mixture may comprise at least 5, 20, 40, 60, 80, 90, 95, or 99.9 wt. % ZIF-8, based on a total weight of solids in the supported ZIF-8 mixture.

In some embodiments, the supported ZIF-8 mixture may comprise at least 40, 50, 60, 70, 80, 90, 95, or 99.9 wt. % water, based on a total weight of liquids in the supported ZIF-8 mixture.

In some embodiments, the ZIF-8 is present in the liquid at a concentration in a range of 0.1 to 10 milligrams per milliliter (mg/mL), preferably 0.6 to 6 mg/mL, preferably 0.8 to 4 mg/mL, preferably 1.0 to 3 mg/mL, and more preferably 1.1 to 2 mg/mL. Other ranges are also possible.

At step 106, the method 100 includes continuously agitating the ZIF-8 mixture in the reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the ZIF-8 mixture occupies at least $1/20$, $1/10$, $3/10$, $1/2$, $2/3$, $4/5$, or $9/10$ of the reactor volume. In still yet some other embodiments, the ZIF-8 mixture occupies no more than $10/11$, $9/10$, $4/5$, $2/3$, $1/2$, $3/10$, or $1/10$ of the reactor volume. Other ranges are also possible.

In order to ensure that the solid and suspended materials in the ZIF-8 mixture remain in suspension it is preferred that a series of recirculation tubes fluidly connect a lower portion of the vertical cylindrical reactor (preferably a bottom portion) with an upper portion or body portion of the vertical cylindrical reactor that contains the ZIF-8 and/or liquid materials present in the reactor. The recirculation tubes may fluidly connect to a conical bottom portion of the vertical cylindrical reactor representing the bottommost portion thereof. A plurality of recirculation routes is preferable. One or more pumping mechanisms functions to draw the ZIF-8 mixture from the bottom portion of the vertical cylindrical reactor and reintroduce the ZIF-8 mixture in suspended form at an upper portion of the body portion of the vertical cylindrical reactor, preferably at a point that is below the uppermost liquid line present inside the vertical cylindrical reactor. During operation one or more recirculation pumps having an upstream connection to an outlet at the bottom of the vertical cylindrical reactor and a downstream connection to the body portion of the vertical cylindrical reactor functions to keep the suspended materials in a suspended state thereby eliminating formation of a hardened plug of solid material at the bottom of the vertical cylindrical reactor. Preferably there are at least four recirculation tubes, one for each of four quadrants defining the cross-section of the vertical cylindrical reactor. The inlet points in the body portion of the vertical cylindrical reactor at which ZIF-8 mixture is returned to the vertical cylindrical reactor are preferably at a height of less than one half the total height of the body portion of the vertical cylindrical reactor preferably at a height of 0.3-0.45 of the total height of the body portion of the vertical cylindrical reactor, e.g., measured from the bottommost portion of the cylindrical shape to the topmost portion of the cylindrical shape not including and cone or extender. During operation both mechanical agitation by a propeller and mechanical agitation by the recirculation tubes may occur such that the solids materials inside the ZIF-8 mixture remain fully suspended without settling.

At step 108, the method 100 includes introducing the $H_2S$-containing gas composition to the reactor containing the ZIF-8 mixture under continuous agitation and passing the $H_2S$-containing gas composition through the ZIF-8 mixture.

In some embodiments, the $H_2S$-containing gas composition is natural gas.

In some embodiments, the $H_2S$-containing gas composition further comprises at least one hydrocarbon selected from the group consisting of methane, ethane, ethylene, propylene, propane, butane, butene, butadiene, and isobutylene. The hydrocarbon may further or alternatively include dimethyl ether, ethyl methyl ether, neopentane. The hydrocarbon may comprise at least 20, 40, 60, 80, 90, 95, 99.5, or 99.9 wt. % methane, ethane, ethylene, propylene, propane, butane, butene, butadiene, and/or isobutylene, based on a total weight of hydrocarbons. Other ranges are also possible.

In some embodiments, the $H_2S$-containing gas composition may further comprise $CO_2$, and the $CO_2$ may be present in 2, 5, 10, 15, 20, 25, 30, 40, 50, 60, 65, 75, 85, 100, 150, 200, 250-fold the amount, or more, of the $H_2S$ based on moles. The gas composition may further contain $N_2$, CO, Ar, $H_2$, He, $NH_3$, $O_2$, and/or $O_3$, but may exclude any or all of these.

In some embodiments, the $H_2S$ is present in the gas composition at a concentration in a range of 10 to 200 parts per million by volume (ppmv), preferably 20 to 180 ppmv, preferably 40 to 160 ppmv, further preferably 60 to 140 ppmv, more preferably 80 to 12 ppmv, or even more preferably 100 ppmv, based on a total volume of the gas composition. Other ranges are also possible.

In some embodiments the $H_2S$-containing gas composition is introduced to the reactor at a rate of 0.4 to 2.0 milliliters per minute (mL/min) per milligram of the ZIF-8, preferably 0.5 to 1.8, preferably 0.6 to 1.6, preferably 0.7 to 1.4, preferably 0.8 to 1.2, preferably 0.9 to 1.1, or 1.0 mL/min per milligram of the ZIF-8. Other ranges are also possible.

In some embodiments, wherein during the introducing and adsorbing the ZIF-8 is in contact with the $H_2S$-containing gas composition at a temperature in a range of from 15 to 40° C., preferably 20 to 35° C., preferably 25 to 30° C. under a pressure of 0.9 to 1.2 bar, preferable 0.95 to 1.15 bar, preferably 1.0 to 1.1 bar. Other ranges are also possible.

At step 108, the inventive method 100 may be carried out at pHs in the neutral range and/or above 4, though the efficiency of the $H_2S$ removal should be within 90% across the pH range of 2 to 13, 3 to 11, 4 to 10, 5 to 8, or 6 to 7.5. No particular considerations need to be taken regarding pH, and acceptable reaction pHs will generally be at the ambient/natural conditions of water available.

At step 110, the method 100 includes adsorbing the $H_2S$ from the $H_2S$-containing gas composition onto the ZIF-8 to remove the $H_2S$ from the $H_2S$-containing gas composition and form a purified gas composition.

In some embodiments, the nanoparticles of ZIF-8 in the liquid may react with the $H_2S$ in the $H_2S$-containing gas composition optionally in the presence of a support to form a metal sulfide and a purified gas composition. In one embodiment, the $H_2S$-containing gas composition is sour gas. In another embodiment, the reactor may include a closed top. In a further embodiment, the sour gas is introduced to the reactor through a gas sparger located at a lower portion of a body portion of the reactor. In some embodiments, the nanoparticles of ZIF-8 are suspended in the liquid. In some further embodiments, the ZIF-8 particles are retained in the liquid phase by a particle trap located at an upper portion of the body portion of the reactor. In another embodiment, the purified gas composition may be accumulated in an upper region of a reactor. In yet another embodiment, the accumulated purified gas composition may be vented from the reactor through the outlets at the top of the reactor to the gas analyzer. In a preferred embodiment, the metal sulfide may be accumulated and settled in the liquid to the lower portion of the body portion of the reactor. In a further preferred embodiment, the metal sulfide accumulated may be removed from the liquid through the outlets at the bottom of the reactor.

In some embodiments, the $H_2S$-containing gas composition may be passed into the ZIF-8 mixture by a gas sparger within the body of the ZIF-8 mixture to distribute the gas composition in the form of small bubbles adjacent to a lower end of the reactor. The procedure may be operated as a continuous process or in intermittent manner and is particularly useful for scavenging operations. In some further embodiments, the $H_2S$-containing gas composition may be heated to a suitable temperature before passing the ZIF-8 mixture. The heated $H_2S$-containing gas composition is then in direct contact with the ZIF-8 mixture to convert substantially all $H_2S$ in the gas composition to metal sulfides.

In some embodiments, exhaustion of the capacity of the ZIF-8 mixture to absorb and convert hydrogen sulfide to metal sulfides may be detected in any convenient manner and to form an exhausted reaction mixture containing metal sulfides. In some further preferred embodiments, the exhausted reaction mixture then is replenished with the ZIF-8 mixture, or by the addition of ZIF-8. Metal sulfides may be removed from the exhausted reaction mixture through the outlets at the bottom of the reactor.

As used herein, the term "breakthrough time" refers to the elapsed time between initial contact of the ZIF-8 with the $H_2S$-containing gas composition and the time at which $H_2S$ is detected in the purified gas composition. In accordance with the present disclosure, the detection limit for $H_2S$ in a gas composition is 0.5 ppm, based on a total weight of the gas composition.

As used herein, the term "saturation time" refers to the time during which the adsorbent is saturated (in equilibrium) with the adsorbate.

As used herein, the term "scavenging capacity," "adsorption capacity", and similar terms generally refer to the amount of adsorbate taken up by the adsorbent per unit mass or per unit volume of the adsorbent. In accordance with the present disclosure, the term refers to the amount of $H_2S$ taken up by the ZIF-8 per gram of the compound.

Figure 4:
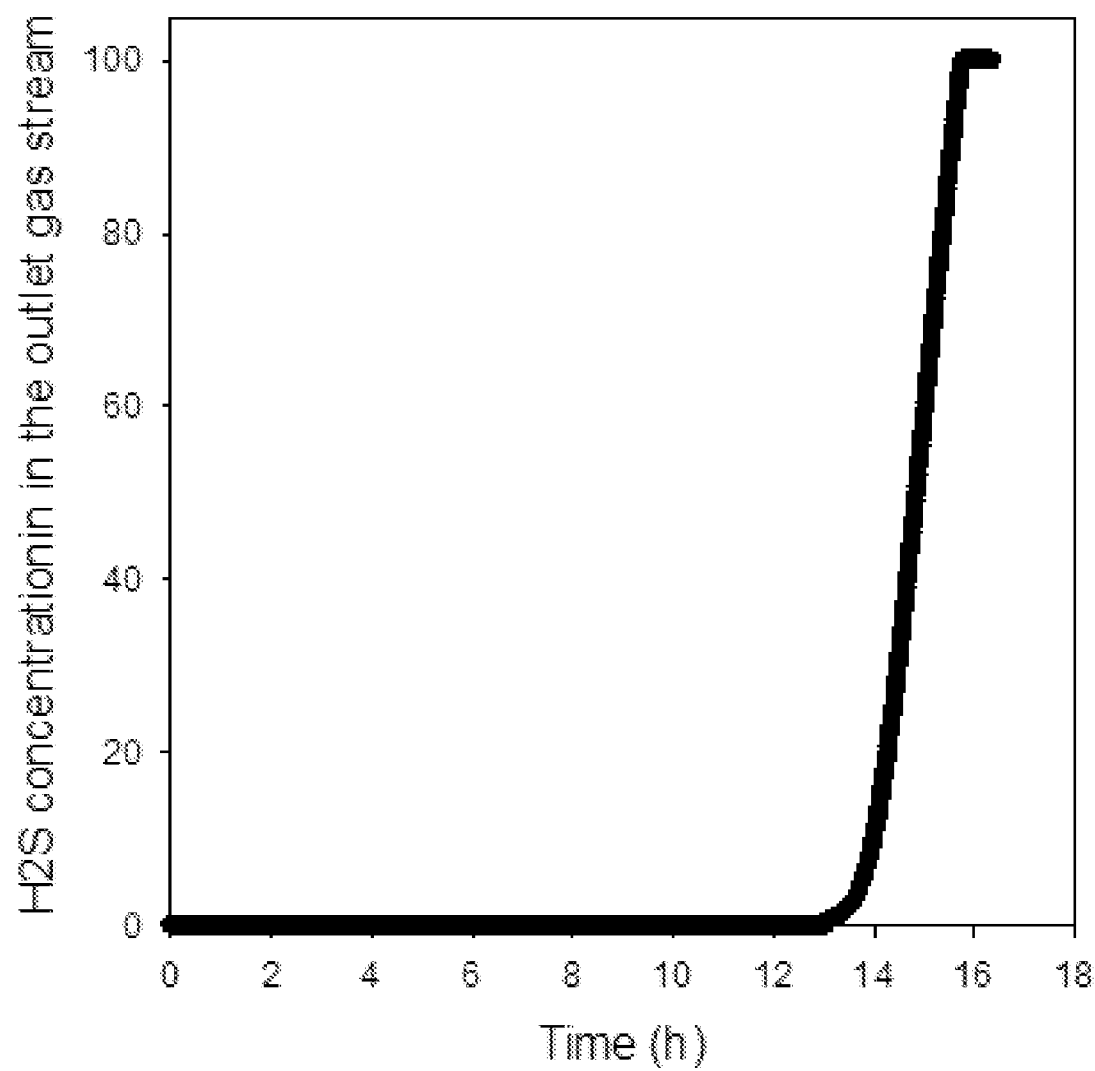
FIG. 4 illustrates a breakthrough curve of $H_2S$ adsorption using a ZIF-8, according to certain embodiments.

As depicted in FIG. 4, in some embodiments, the $H_2S$ content in the purified gas composition after adsorbing by the ZIF-8 is no more than 100 ppmv, 80 ppmv, 60 ppmv, 40 ppmv, 20 ppmv, or 10 ppmv, based on a total volume of the purified gas composition for 1 to 16 hours, preferable 2 to 15 hours, preferably 13 hours of contact with the ZIF-8 at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. Other ranges are also possible As used herein, the term "BET," "BET surface area," "BET specific surface area" or similar terms are computed from Brunauer-Emmett-Teller (BET) analysis of a nitrogen adsorption isotherm. The nitrogen adsorption isotherm measures the available pore volume for the adsorbate (e.g., nitrogen) through the adsorption isotherm and hence compare the pore dimensions derived from adsorption data with those estimated independently when pore filling is not necessary.

BET analysis of nitrogen adsorption-desorption isotherm and pore-size distribution curves of the ZIF-8 is measured on a Quantachrome Autosorb 1-C instrument with $N_2$ adsorption at 77 K. The ZIF-8 was outgassed at 120° C. without exposure to air before nitrogen loading. The BET surface area was determined with a P/P0 range of 0.01 to 0.04, or any other suitable range for porous materials. Analysis of isotherms is carried out by applying various methods to obtain different information. The BET equation may be used to get the BET surface area from the $N_2$ isotherm. The T-method may be used to find the micropore volume and the external surface area of the mesoporous fraction from the volume of $N_2$ adsorbed up to the P/P0=0.0315. The DFT method may be used to estimate surface area as a function of pore size, while the BET method may be used to report total surface area.

Figure 3:
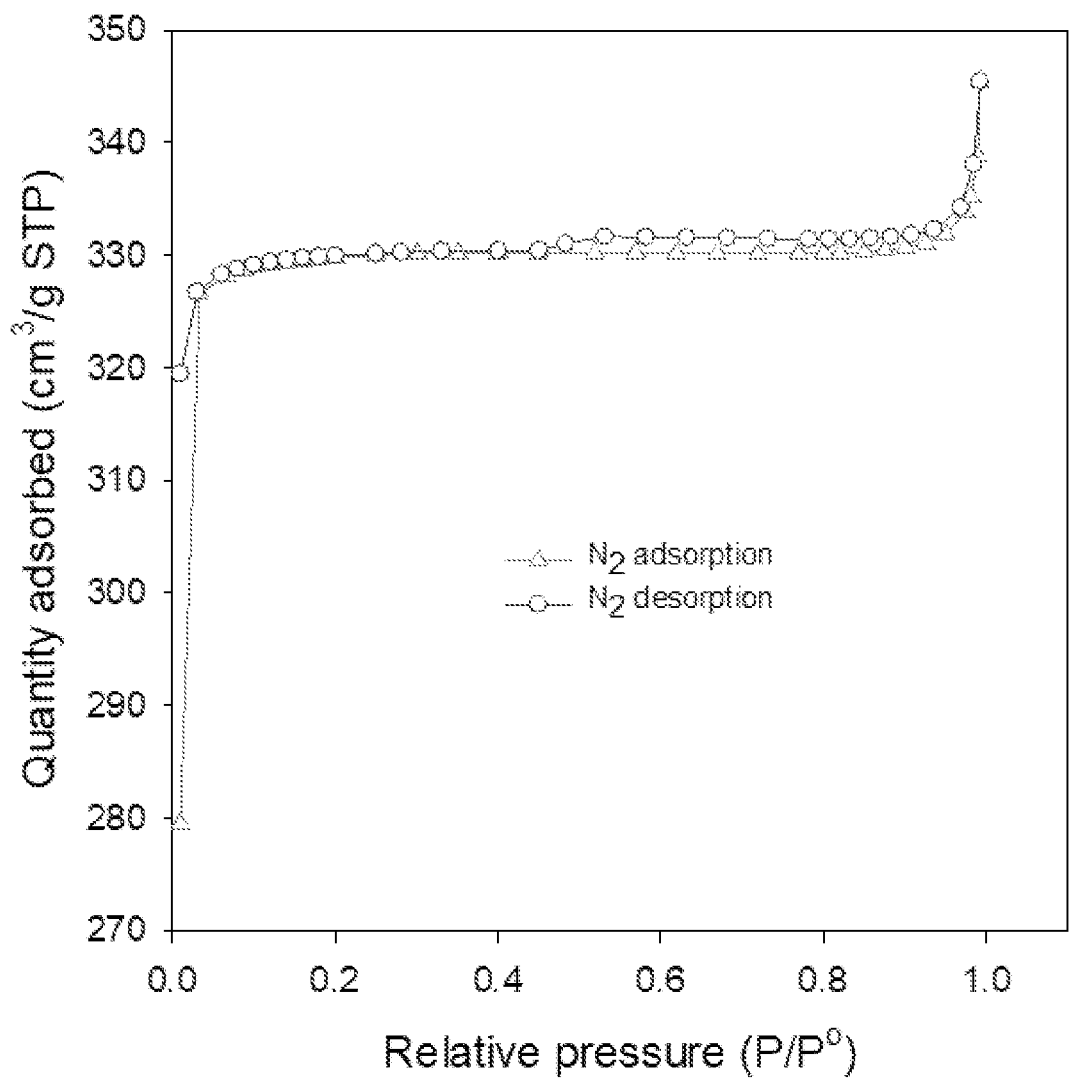
FIG. 3 illustrates a BET hysteresis curve of a ZIF-8, according to certain embodiments.

Referring to FIG. 3, a BET hysteresis curve of the ZIF-8. In some embodiments, the ZIF-8 has a specific surface area in a range of 900 to 1500 m²/g, preferably 1000 to 1400 m²/g, preferably 1100 to 1300 m²/g, or more preferably about 1200 m²/g. In some other embodiments, the ZIF-8 has a cumulative specific pore volume in a range of 0.2 to 0.8 cm³/g, preferably 0.3 to 0.7 cm³/g, preferably 0.4 to 0.6 cm³/g, or more preferably about 0.5 cm³/g. In some further embodiments, the ZIF-8 has an average pore diameter of 0.5 to 3.5 nm, preferably 1 to 2.5 nm, preferably 1.5 to 2 nm, or more preferably about 1.7 nm. Other ranges are also possible.

According to a second aspect, the present disclosure further relates to a method of making the ZIF-8, and its application in a continuous stirred tank process for the desulfurization of sour gases and liquid hydrocarbon fuels.

Figure 6:
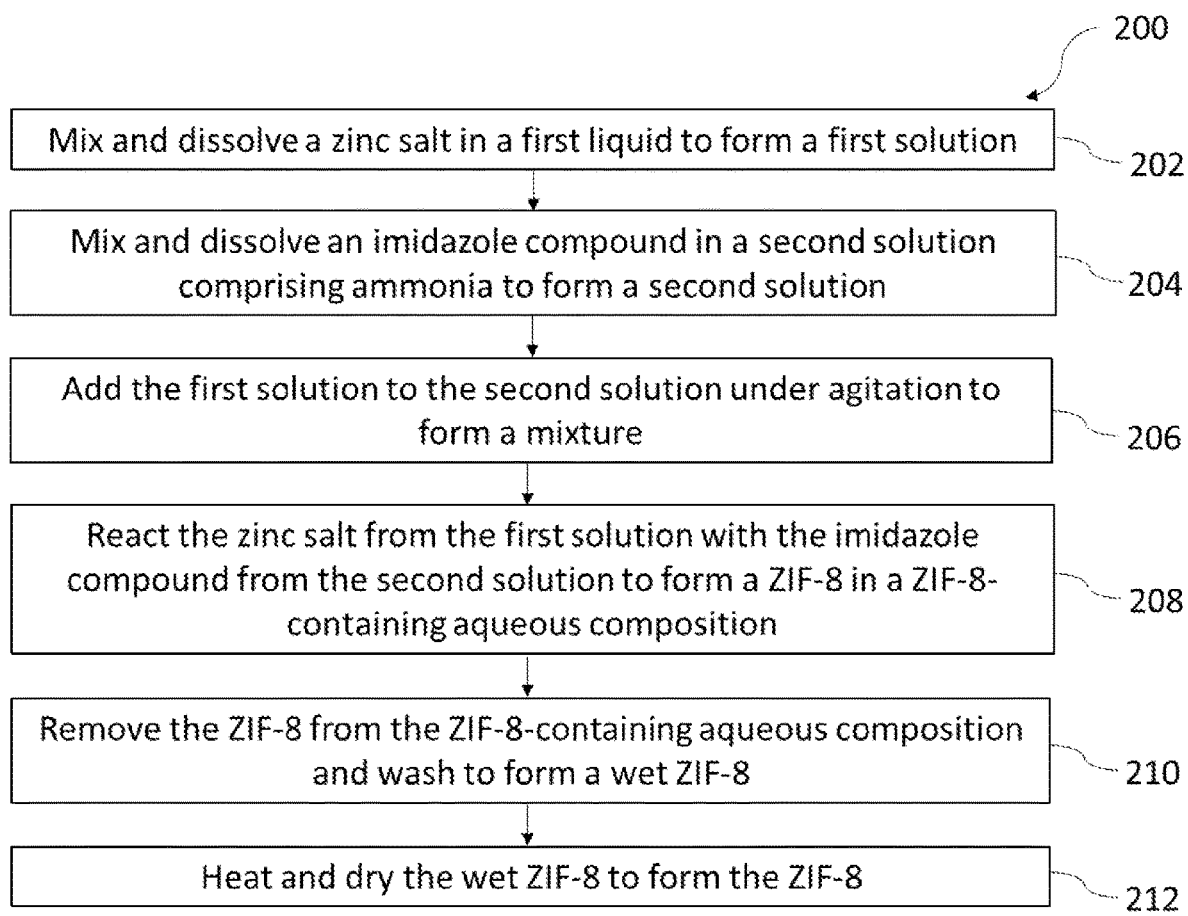
FIG. 6 is a schematic flow diagram of a method of making a ZIF-8, according to certain embodiments.

Referring to FIG. 6, the method of making the ZIF-8 includes (i) mixing and dissolving a zinc salt in a first liquid to form a first solution, (ii) mixing and dissolving an imidazole compound in a second solution comprising ammonia to form a second solution, (iii) adding the first solution to the second solution under agitation to form a mixture, (iv) reacting the zinc salt from the first solution with the imidazole compound from the second solution to form the ZIF-8 in a ZIF-8-containing aqueous composition, (v) removing the ZIF-8 from the ZIF-8-containing aqueous composition and washing to form a wet ZIF-8, and (vi) heating and drying the wet ZIF-8 to form the ZIF-8.

At step 202, the method 200 includes mixing and dissolving a zinc salt in a first liquid to form a first solution. In some embodiments, the zinc salt is at least one selected from the group consisting of zinc sulfate, zinc acetate, zinc citrate, zinc iodide, zinc chloride, zinc perchlorate, zinc nitrate, zinc phosphate, zinc triflate, zinc bis(trifluoromethanesulfonyl) imide, zinc tetrafluoroborate, zinc bromide, and/or its hydrate. In some preferred embodiments, the zinc salt may be zinc nitrate, and/or zinc nitrate hexahydrate. In some embodiments, the first liquid is selected from the group consisting of tap water, ground water, distilled water, deionized water, hard water, and fresh water. In some preferred embodiments, the first liquid may be distilled water, and deionized water. In some embodiments, the zinc slat is present in the first solution at a concentration of 20 to 100 millimolars (mM), preferably 30 to 80 mM, preferably 40 to 60 mM, or more preferably 50 mM. Other ranges are also possible.

At step 204, the method 200 includes mixing and dissolving an imidazole compound in a second solution comprising ammonia to form a second solution. In some embodiments, the second liquid is selected from the group consisting of tap water, ground water, distilled water, deionized water, hard water, and fresh water. In some preferred embodiments, the liquid may be distilled water, and deionized water. In some embodiments, ammonia may be replaced by another alkali metal base which has at least one metal ion selected from the group consisting of Li, Na, K, Ca, or a combination thereof. In some embodiments, ammonia is present in the second solution at a concentration of 15-45 wt. % based on a total weight of the second solution, preferably 17.5 to 40 wt. %, preferably 20 to 35 wt. %, preferably 22.5 to 30 wt. %, or more preferably 25 wt. % based on a total weight of the second solution.

In some embodiments, the imidazole compound comprises an imidazole of formula (I) and a benzimidazole of formula (II):

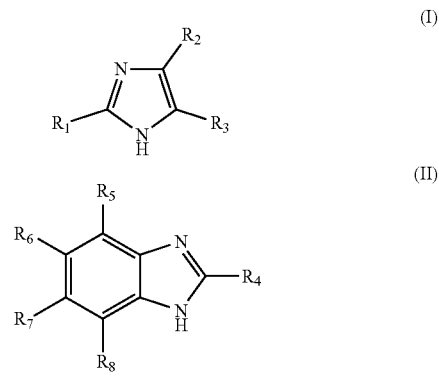

in which, $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. In some preferred embodiments, the imidazole compound may be 2-methylimidazole (2-MIM). In some further embodiments, the imidazole compound is present in the second solution at a concentration of 100 to 300 millimolars (mM), preferably 125 to 275 mM, preferably 150 to 250 mM, preferably 175 to 225 mM, or even more preferably about 200 mM. Other ranges are also possible.

At step 206, the method 200 includes adding the first solution to the second solution under agitation to form a mixture. In some embodiments, the mixture has a pH value of about 9, preferably about 9.5, preferably about 10, preferably about 10.5, preferably about 11, or preferably about 11.5. Other ranges are also possible.

At step 208, the method 200 includes reacting the zinc salt from the first solution with the imidazole compound from the second solution to form the ZIF-8 in a ZIF-8-containing aqueous composition. In some embodiments, a molar ratio of the zinc salt to the imidazole compound present in the mixture is in a range of 1:2.5 to 1:5.5, preferably 1:3 to 1:5, preferably 1:3.5 to 1:4.5, or even more preferably about 1:4. In some further embodiments, the zinc salt is zinc nitrate. In some further preferred embodiments, the imidazole compound is 2-methylimidazole. In yet still other embodiments, the ZIF-8 containing aqueous composition is continuously mixed with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. for at least 1 hour, at least 2 hours, at least 4 hours, or even more preferably at least 12 hours. Other ranges are also possible.

At step 210, the method 200 includes removing the ZIF-8 from the ZIF-8-containing aqueous composition and washing to form a wet ZIF-8. In some embodiments, the wet ZIF-8 after the removing is washed with distilled water to remove all impurities for at least 1 time, at least 3 times, at least 5 times, at least 10 times, or at least 30 times before heating and drying. Other ranges are also possible.

At step 212, the method 200 includes heating and drying the wet ZIF-8 to form the ZIF-8. In some embodiments, the wet ZIF-8 is heated in an oven at a temperature in a range of 80 to 200° C., 85 to 160° C., preferably 90 to 150° C., further preferably 100 to 140° C., preferably 110 to 130° C., and more preferably 120° C. for 6 to 72 hours, 12 to 48 hours, 18 to 36 hours, or preferably 24 hours. In some further embodiments, drying is conducted in an oven at a temperature in a range of 50 to 130° C., preferably 60 to 110° C., preferably 70 to 90° C., or more preferably 90° C. for 6 to 72 hours, 12 to 48 hours, 18 to 36 hours, or preferably 24 hours to afford the ZIF-8. Other ranges are also possible.

Aspects of the invention provide two or three-phase processes for scavenging $H_2S$ from a $H_2S$-containing gas composition, i.e., a gas composition comprising a hydrocarbon and $H_2S$, such as a sour natural gas, biogas, refinery gas, syn gas, cracking off-gas or at least partially purified methane, ethane, ethylene, propylene, propane, butane, butene, butadiene, and/or isobutylene gas(es). Gas phases may comprise $H_2S$, $CO_2$, and a hydrocarbon, e.g., methane. Liquid phases within the invention, when present, may comprise or consist essentially of water, i.e., at least 75, 80, 85, 90, 91, 92, 92.5, 93, 94, 95, 96, 97, 97.5, 98, 99 99.1, 99.5, 99.9, 99.99, 99.999, or 99.9999 wt. % of a total weight of the liquid phase weight being water. Solid phases generally contain a ZIF-8. The gas(es) may be continuously bubbled through a stirred tank reactor, contacting with the ZIF-8, in an air or at least partially inert atmosphere or within the bulk of liquid phase, e.g., water, an aqueous mixture/solution, an organic phase.

According to an inventive two or three-phase processes for scavenging $H_2S$ from a $H_2S$-containing gas composition, in certain aspects, the ZIF-8 is present in water at a concentration of 1 mg/mL. In some embodiments, the ZIF-8 is in contact with the gas composition comprising 100 ppmv of $H_2S$ at a rate of 80 mL/min in a stirred tank reactor. In some embodiments, the ZIF-8 has a breakthrough time of at least 2 hours, at least 4 hours, at least 8 hours, or at least 16 hours. Other ranges are also possible.

The examples below are intended to further illustrate protocols for preparing, characterizing, and using the ZIF-8 and for performing the method described above and are not intended to limit the scope of the claims.

Where a numerical limit or range is stated herein, the endpoints are included. Also, all values and subranges within a numerical limit or range are specifically included as if explicitly written out.

EXAMPLES

The following examples describe and demonstrate a process for removing hydrogen sulfide ($H_2S$) from a $H_2S$-containing gas composition described herein. The examples are provided solely for illustration and are not to be construed as limitations of the present disclosure, as many variations thereof are possible without departing from the spirit and scope of the present disclosure.

Example 1: ZIF-8 Preparation

ZIF-8 was prepared by the precursors of zinc nitrate hexahydrate and 2-methylimidazole (2-MIM). Zinc nitrate hexahydrate solution (50 mM) was prepared by dissolving a certain amount of zinc nitrate hexahydrate in a specific volume of distilled water. 2-MIM solution (200 mM) was prepared by dissolving the desired amount of 2-MIM in a 25% ammonia solution. The volumes of both solutions were approximately the same. Then, the zinc solution was added quickly to the 2-MIM solution under a vigorous stirring at room temperature. Upon completion of the zinc solution addition, the reaction mixture was vigorously stirred for 1 h to ensure the completion of the reaction. After that, the formed ZIF-8 was kept standing for an additional 1 h. Then, ZIF-8 was collected by centrifugation for 30 min at 8000 rpm. To remove the unreacted precursors, the collected ZIF-8 was washed several times with distilled water (30 min each cycle). Then, the purified ZIF-8 was dried at 60° C.

Example 2: $H_2S$ Adsorption by the ZIF-8

ZIF-8 was suspended in water (pH 7) using stirring at 700 rpm. The mass of ZIF-8 was 100 mg and the volume of water was 100 mL (filling about ⅔ of the reactor level). Sour gas stream containing $H_2S$ (100.2 ppmv) and the balance $N_2$ is introduced at 80 mL/min. The process was conducted at room temperature (~25° C.) and atmospheric pressure. The gas exiting the reactor is sent to an $H_2S$ gas detector with a detection limit of 0.5 ppm. The exit gas was monitored and the concentration of $H_2S$ in the treated gas was continuously recorded.

Example 3: FTIR Analysis of the ZIF-8

FTIR spectra of the ZIF-8 was studied by using Fourier transform infrared spectra (Nicolet 170 IR spectrometer). For the Fourier transform infrared spectra characterization, the KBr discs of the samples were prepared by mixing and grounding the samples with KBr powder in mortar with pestle. The ZIF-8 was then shaped into discs under mechanical pressure. The samples discs were put into Fourier transform infrared spectra and spectral measurements were recorded in the wavenumber range of 450-4000 $cm^{-1}$. Prior to the above measurement, the samples were vacuum-dried at 60° C. for a duration of 24 h. FIG. 2 shows the FTIR spectra of the ZIF-8. The peaks appearing in the spectra correspond to the functional groups in the ZIF-8 structure.

Example 4: The BET Hysteresis Analysis

BET analysis of nitrogen adsorption-desorption isotherm and pore-size distribution curves of the ZIF-8 was measured on a Quantachrome Autosorb 1-C instrument with $N_2$ adsorption at 77 K. The ZIF-8 was outgassed at 120° C. without exposure to air before nitrogen loading. The BET surface area was determined with a P/P0 range of 0.01 to 0.04. Analysis of isotherms was carried out by applying various methods to obtain different information. The BET equation was used to get the BET surface area from the $N_2$ isotherm. The T-method was used to find the micropore volume and the external surface area of the mesoporous fraction from the volume of $N_2$ adsorbed up to the P/P0=0.0315. The DFT method was used to estimate surface area as a function of pore size, while the BET method was used to report total surface area.

FIG. 3 shows the BET hysteresis curve obtained using ZIF-8. The BET specific surface area, cumulative specific pore volume, and average pore diameter are 1209 $m^2/g$, 0.516 $cm^3/g$, and 1.71 nm, respectively.

It is also noteworthy to mention that the ZIF-8 loading can be adjusted depending on the $H_2S$ concentration in the $H_2S$-containing gas composition as well as the sour gases flow rate. The loading of ZIF-8 can be high such that it can form a thick reaction slurry (i.e., slurry phase reaction). Additionally, the stirring speed, medium pH, volume, reaction temperature, pressure, and gas inlet flow rate can be adjusted to meet the reactor configurations and design parameters.

Example 5: Application in Sour Oil Desulfurization

Sour oil can also be treated by the method described in the present disclosure. Firstly, the sour oil is emulsified in water to form an emulsion. Then, the ZIF-8 is mixed and suspended in the emulsion. Additionally, the contact between the sulfur-bearing components of the sour oil in the emulsion and the ZIF-8 promote the desulfurization of sour oil.

Numerous modifications and variations of the present disclosure are possible in light of the above teachings. It is therefore to be understood that within the scope of the appended claims, the invention may be practiced otherwise than as specifically described herein.

The invention claimed is:

1. A process for removing hydrogen sulfide ($H_2S$) from a $H_2S$-containing gas composition, comprising:
charging a liquid to a reactor under continuous agitation;
dispersing particles of a zinc-based zeolitic imidazolate framework-8 (ZIF-8) in the liquid to form a ZIF-8 mixture;
continuously agitating the ZIF-8 mixture;
introducing the $H_2S$-containing gas composition to the reactor containing the ZIF-8 mixture under continuous agitation and passing the $H_2S$-containing gas composition through the ZIF-8 mixture;
adsorbing the $H_2S$ from the $H_2S$-containing gas composition onto the ZIF-8 to remove the $H_2S$ from the $H_2S$-containing gas composition and form a purified gas composition.

2. The process of claim 1, wherein the ZIF-8 particles have a mean particle size in a range of 5 to 200 nm.

3. The process of claim 1, wherein the ZIF-8 particles having:
a porous structure; and
a mean pore size in a range of 0.5 to 5 nm.

4. The process of claim 1, wherein the ZIF-8 is supported on at least one support selected from the group consisting of a graphene-based material, an alumina, a carbon nanotube, an activated carbon, a metal organic framework (MOF), a zeolitic nanotube, and a covalent organic polymer (COP).

5. The process of claim 4, wherein the supported ZIF-8 has a delaminated structure comprising charged crystalline particles, in which a distance between laminated layers is in a range of 1 to 50 nm.

6. The process of claim 4, wherein the graphene-based material comprises at least one selected from the group consisting of graphene, graphyne, graphydiyne, graphene oxide, reduced graphene oxide, and exfoliated graphite.

7. The process of claim 4, wherein a weight ratio of the ZIF-8 to the support is from 20:1 to 1:20.

8. The process of claim 1, wherein the liquid comprises at least one selected from the group consisting of tap water, ground water, distilled water, deionized water, saltwater, hard water, fresh water, and wastewater.

9. The process of claim 1, wherein the reactor is a stirred tank reactor in the form of a vertical cylindrical reactor containing at least one propeller agitator disposed therein, wherein the vertical cylindrical reactor has a bottom portion, a vertically oriented cylindrical body portion and a top portion, wherein the bottom portion is cone shaped or pyramidal, wherein a plurality of recirculation tubes fluidly connects the bottom portion of the vertical cylindrical reactor with the body portion of the vertical cylindrical reaction.

10. The process of claim 1, wherein the $H_2S$-containing gas composition is natural gas.

11. The process of claim 1, wherein the $H_2S$-containing gas composition further comprises at least one gas selected from the group consisting of nitrogen, argon, methane, ethane, ethylene, propylene, propane, butane, butene, butadiene, and isobutylene.

12. The process of claim 1, wherein the $H_2S$ is present in the gas composition at a concentration in a range of 10 to 200 parts per million by volume (ppmv) based on a total volume of the gas composition.

13. The process of claim 1, wherein the $H_2S$-containing gas composition is introduced to the reactor at a rate of 0.4 to 2.0 milliliters per minute (mL/min) per milligram of the ZIF-8.

14. The process of claim 1, wherein the ZIF-8 is present in the liquid at a concentration in a range of 0.1 to 10 milligrams per milliliter (mg/mL).

15. The process of claim 1, wherein during the introducing and adsorbing the ZIF-8 is in contact with the $H_2S$-containing gas composition at a temperature in a range of from 15 to 40° C. and under a pressure of 0.9 to 1.2 bar.

16. The process of claim 1, further comprising:
preparing the ZIF-8 by:
mixing and dissolving a zinc salt in a first liquid to form a first solution;
mixing and dissolving an imidazole compound in a second solution comprising ammonia to form a second solution;
adding the first solution to the second solution under agitation to form a mixture;
reacting the zinc salt from the first solution with the imidazole compound from the second solution to form the ZIF-8 in a ZIF-8-containing aqueous composition;
removing the ZIF-8 from the ZIF-8-containing aqueous composition and washing to form a wet ZIF-8;
heating and drying the wet ZIF-8 to form the ZIF-8.

17. The process of claim 16, wherein the zinc salt is at least one selected from the group consisting of zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, zinc bromide, and/or its hydrate.

18. The process of claim 16, wherein the imidazole compound comprises an imidazole of formula (I) and a benzimidazole of formula (II):

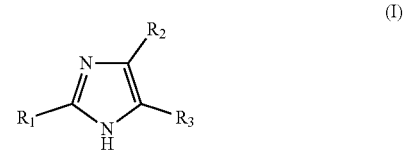

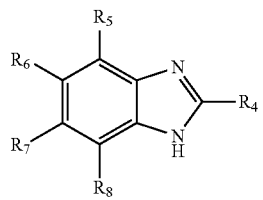
(II)

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano.

19. The process of claim 16, wherein:
a molar ratio of the zinc salt to the imidazole compound present in the mixture is in a range of 1:2 to 1:6; and
the imidazole compound is 2-methylimidazole.

20. The process of claim 16, wherein the ZIF-8 having:
a specific surface area in a range of 900 to 1500 $m^2/g$;
a cumulative specific pore volume in a range of 0.2 to 0.8 $cm^3/g$; and
an average pore diameter of 0.5 to 3.5 nm.

* * * * *